United States Patent
Bu et al.

(10) Patent No.: US 12,353,085 B2
(45) Date of Patent: Jul. 8, 2025

(54) BACKLIGHT MODULE, DISPLAY MODULE, SPLICED DISPLAY SCREEN AND DISPLAY APPARATUS

(71) Applicants: Beijing BOE Display Technology Co., Ltd., Beijing (CN); BOE Technology Group Co., Ltd., Beijing (CN)

(72) Inventors: Zhanchang Bu, Beijing (CN); Qingshan Qu, Beijing (CN); Jixing Sun, Beijing (CN); Bochang Wang, Beijing (CN); Haijun Shi, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/271,232

(22) PCT Filed: May 31, 2022

(86) PCT No.: PCT/CN2022/096129
§ 371 (c)(1),
(2) Date: Jul. 6, 2023

(87) PCT Pub. No.: WO2023/230809
PCT Pub. Date: Dec. 7, 2023

(65) Prior Publication Data
US 2025/0004315 A1 Jan. 2, 2025

(51) Int. Cl.
*G02F 1/1333* (2006.01)
*G02F 1/13357* (2006.01)

(52) U.S. Cl.
CPC .... *G02F 1/13336* (2013.01); *G02F 1/133605* (2013.01); *G02F 1/133606* (2013.01); *G02F 1/133608* (2013.01); *G02F 1/133611* (2013.01)

(58) Field of Classification Search
CPC ......... G02F 1/133603; G02F 1/133605; G02F 1/133606; G02F 1/133608;
(Continued)

(56) References Cited

U.S. PATENT DOCUMENTS

2016/0011461 A1* 1/2016 Kim ................. G02F 1/133608
349/64
2017/0082267 A1 3/2017 Gagne et al.
(Continued)

FOREIGN PATENT DOCUMENTS

CN 107357063 A 11/2017
CN 107920432 A 4/2018
(Continued)

*Primary Examiner* — Erin Kryukova
(74) *Attorney, Agent, or Firm* — HOUTTEMAN LAW LLC

(57) ABSTRACT

A backlight module is provided to include a back plate, and a light source, a middle frame, a diffuser plate, an optical film layer sequentially arranged in a direction away from the back plate; a light outgoing surface of the light source faces the diffuser plate; orthographic projections of the optical film layer, the diffuser plate and the light source on the back plate overlap with each other; an orthographic projection of the middle frame on the back plate overlaps with a peripheral edge of the back plate; the middle frame is connected to the peripheral edge; the orthographic projection of the middle frame on the back plate does not overlap with that of the light source; the middle frame includes a body structure and a first support portion, which have a one-piece structure; the body structure is on a side of the diffuser plate close to the back plate.

19 Claims, 9 Drawing Sheets

(58) Field of Classification Search
CPC ........... G02F 1/133611; G02F 1/13336; G02F 1/133317; G02F 1/133617; G02F 1/122611
See application file for complete search history.

(56) References Cited

U.S. PATENT DOCUMENTS

| | | | | |
|---|---|---|---|---|
| 2017/0083273 | A1* | 3/2017 | Kim | G02F 1/133317 |
| 2017/0123274 | A1* | 5/2017 | Jeong | G02F 1/133608 |
| 2017/0322443 | A1* | 11/2017 | Han | G02F 1/133608 |
| 2020/0310198 | A1* | 10/2020 | Li | G02F 1/133606 |
| 2021/0181582 | A1* | 6/2021 | Yoon | G02F 1/133608 |

FOREIGN PATENT DOCUMENTS

| | | | | |
|---|---|---|---|---|
| CN | 209946590 | U | | 1/2020 |
| CN | 210428030 | U | * | 4/2020 |
| CN | 210743444 | U | | 6/2020 |
| CN | 111880336 | A | | 11/2020 |
| CN | 214795497 | U | | 11/2021 |
| CN | 215297867 | U | | 12/2021 |
| CN | 114265225 | A | | 4/2022 |
| CN | 114399959 | A | | 4/2022 |
| KR | 20210018660 | A | | 2/2021 |
| KR | 20210085701 | A | | 7/2021 |
| WO | WO 0201284 | A1 | | 1/2002 |
| WO | WO-2021212705 | A1 | * | 10/2021 ....... G02F 1/133308 |

* cited by examiner

BACKLIGHT MODULE, DISPLAY MODULE, SPLICED DISPLAY SCREEN AND DISPLAY APPARATUS

TECHNICAL FIELD

The present disclosure relates to the field of display technology, and in particular to a backlight module, a display module, a spliced display screen and a display apparatus.

BACKGROUND

The spliced display screen series products form a product technology competitive firewall in the market, but the competition in the market is very fierce, so that the products need to be kept for iterative upgrade all the time to meet the requirements of terminal customers. The actual size of the splicing seam and the peripheral image quality of the spliced display screen series products are main concerns in the competition in the market, so that the problems to be solved firstly at present are to reduce physical splicing seams and improve the peripheral image quality.

SUMMARY

The embodiment of the present disclosure provides a backlight module, a display module, a spliced display screen and a display apparatus.

In a first aspect, an embodiment of the present disclosure provides a backlight module, including: a back plate, a light source, a middle frame, a diffuser plate and an optical film layer; wherein the light source, the middle frame, the diffuser plate and the optical film layer are on the back plate and are sequentially arranged in a direction away from the back plate; a light outgoing surface of the light source faces the diffuser plate; orthographic projections of the optical film layer, the diffuser plate and the light source on the back plate overlap with each other; an orthographic projection of the middle frame on the back plate overlaps with a peripheral edge of the back plate; the middle frame is connected to the peripheral edge of the back plate; the orthographic projection of the middle frame on the back plate does not overlap with the orthographic projection of the light source on the back plate; the middle frame includes a body structure and a first support portion, wherein the body structure and the first support portion are connected together to have a one-piece structure; the body structure is on a side of the diffuser plate close to the back plate, and the body structure supports a peripheral edge of the diffuser plate; the first support portion is around an outer side of an edge end face of the diffuser plate and an edge end face of the optical film layer, and is used for supporting a peripheral edge of a display panel on a side of the optical film layer away from the back plate; and the first support portion is made of a light-transmitting material.

In some embodiments, the body structure includes a body portion and a second support portion, the body portion and the second support portion are sequentially arranged in the direction away from the back plate, and the body portion and the second support portion are connected together to have a one-piece structure; the second support portion is in contact with a surface of the diffuser plate close to the back plate; the second support portion extends in a direction close to the edge end face of the diffuser plate, and is connected to the first support portion; and the second support portion is made of a light-transmitting material.

In some embodiments, the body portion includes a first surface and a second surface, the first surface is one surface of the body portion away from the diffuser plate; the second surface is the other surface than the first surface of the body portion; and the first support portion and/or the second support portion further extends to cover at least the second surface of the body portion.

In some embodiments, the backlight module further includes a first reflector on an outer side surface of the middle frame away from the edge end face of the diffuser plate and the edge end face of the optical film layer, wherein the first reflector covers a light-transmitting material layer on the outer side surface of the middle frame; and the first reflector is in contact with the light-transmitting material layer, and the first reflector is capable of reflecting light irradiated onto the first reflector from the light source into the light-transmitting material layer.

In some embodiments, a groove is formed in a light-transmitting material layer on the outer side surface of the middle frame away from the edge end face of the diffuser plate and the edge end face of the optical film layer; the groove is recessed towards the edge end face of the diffuser plate; the groove includes an arc surface which is convex towards a side where the first support portion is located; a second reflector is on the arc surface; and the second reflector is capable of reflecting light irradiated onto the second reflector from the light source towards inside of the first support portion.

In some embodiments, the groove is at a height where a surface of the body portion close to the diffuser plate is located.

In some embodiments, the first support portion includes a support surface for contacting and supporting the display panel; the backlight module further includes a third reflector on the outer side surface of the middle frame away from the edge end face of the diffuser plate and the edge end face of the optical film layer, and an orthographic projection of the third reflector on the outer side surface is between the support surface of the first support portion and the groove; and the third reflector is in contact with the light-transmitting material layer, and is capable of reflecting the light irradiated onto the third reflector from the light source into the light-transmitting material layer.

In some embodiments, a distance between an edge of the third reflector close to the support surface of the first support portion and the support surface of the first support portion along an arrangement direction of the back plate, the diffuser plate and the optical film layer is in a range of 1.5 mm to 2 mm; and a distance between two edges of the third reflector sequentially arranged in a direction away from the support surface of the first support portion is in a range of 3 mm to 4 mm.

In some embodiments, the third reflector surrounds the whole outer side surface of the middle frame away from the edge end face of the diffuser plate and the edge end face of the optical film layer.

In some embodiments, the backlight module further includes a fourth reflector on the outer side surface of the middle frame away from the edge end face of the diffuser plate and the edge end face of the optical film layer; the fourth reflector covers the region of the light-transmitting material layer except for the region where the third reflector is located and covers an opening of the groove; the fourth reflector is in contact with the light-transmitting material layer, and the fourth reflector is capable of reflecting the light irradiated onto the fourth reflector from the light source into the light-transmitting material layer.

In some embodiments, the first reflector includes a concave-convex structure thereon and on a surface of the first reflector in contact with the middle frame.

In some embodiments, the first reflector has a reflectivity in a range from 40% to 50%; and the first reflector has a diffuse reflectivity in a range from 95% to 97%.

In some embodiments, the body portion is made of a metal or a metal alloy; and the light-transmitting material includes a transparent resin material doped with diffusion particles.

In some embodiments, each of the second reflector and the fourth reflector has a reflectivity in a range of 80% to 90%, respectively.

In some embodiments, the third reflector has a reflectivity in a range of 28% to 30%; and the third reflector has an absorptivity in a range of 70% to 72% for the light irradiated onto the third reflector from the light source.

In some embodiments, the body portion is made of a metal or a metal alloy; and the light-transmitting material includes a transparent resin material.

In some embodiments, a dimension of the first support portion in a direction away from the edge end face of the diffuser plate is a thickness thereof; a thickness of the first support portion is 0.8 mm or more; and a dimension of the second support portion in a direction away from the back plate is a thickness thereof, and the thickness of the second support portion is in a range of 1.2 mm to 2 mm.

In some embodiments, the back plate includes a bottom wall and a side wall, the side wall surrounds a peripheral edge of the bottom wall, and is connected to the bottom wall to form a first accommodating space, the light source is in the first accommodating space and on the bottom wall; and a part of the side wall on at least one side is recessed towards the first accommodating space to form a second accommodating space at a recessed surface away from the first accommodating space.

In some embodiments, the backlight module further includes a reflective layer on a side of the bottom wall of the back plate close to the diffuser plate; wherein an orthographic projection of the reflective layer on the bottom wall of the back plate covers a region except the region where the light source is located; and a peripheral edge of the reflective layer extends towards the middle frame and laps with a surface of the middle frame close to the bottom wall of the back plate.

In a second aspect, an embodiment of the present disclosure further provides a display module, which includes the backlight module, and further includes: a display panel on a side of the optical film layer of the backlight module away from the back plate, wherein the first support portion of the backlight module is in contact with the peripheral edge of the display panel and supports the display panel.

In some embodiments, the second support portion of the backlight module is on a side of the first support portion away from the display panel, and configured to support the first support portion; and the body portion of the backlight module is on a side of the second support portion away from the display panel, and configured to support the second support portion and the first support portion.

In some embodiments, the second accommodating space on the side wall of the back plate is used for accommodating a peripheral circuit board and/or a flexible circuit board bound to the display panel.

In a third aspect, an embodiment of the present disclosure further provides spliced display screen, including a plurality of the above display modules, wherein corresponding edges of the plurality of display modules abut against each other, and the display surfaces of the plurality of display modules are flush with each other.

In some embodiments, the display module includes a binding-side frame region and a non-binding-side frame region, and in any two display modules abutting against each other, the binding-side frame region of one of the display modules abuts against the non-binding-side frame region of the other one of the display modules to form a splicing seam.

In some embodiments, a width of the binding-side frame region is 1.2 mm or more; and a width of the non-binding-side frame region is 0.5 mm or more.

In some embodiments, a width of the splicing seam is 2.3 mm or more.

In a fourth aspect, an embodiment of the present disclosure further provides a display apparatus, including the above spliced display screen.

BRIEF DESCRIPTION OF DRAWINGS

The accompanying drawings, which are provided for further understanding of embodiments of the present disclosure and constitute a part of this specification, are for explaining the present disclosure together with the embodiments of the present disclosure, but are not intended to limit the present disclosure. The above and other features and advantages will become more apparent to ordinary skill in the art by describing in detail exemplary embodiments thereof with reference to the drawings. In the drawings.

DETAIL DESCRIPTION OF EMBODIMENTS

Figure 1:
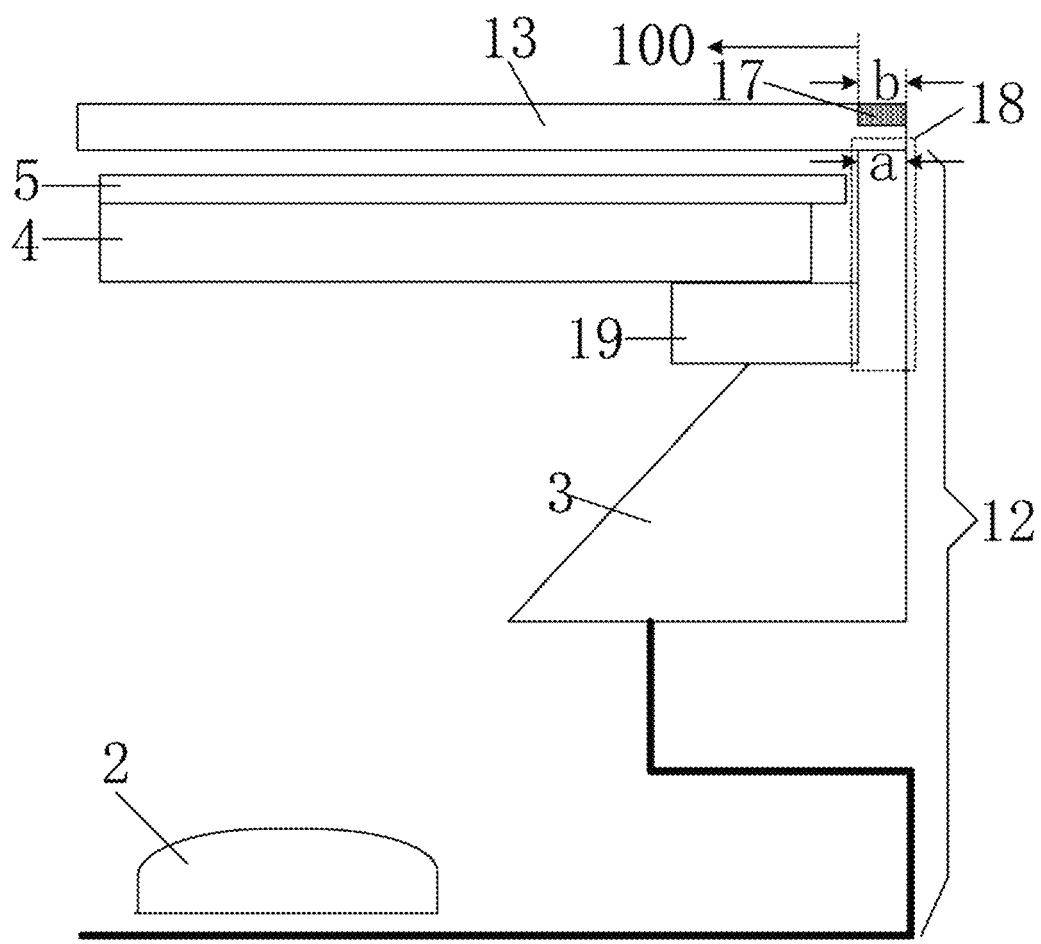
FIG. 1 is a schematic cross-sectional view of a structure of an edge of a part of a display module in a spliced display screen in the prior art.

In order to enable one of ordinary skill in the art to better understand the technical solutions of the embodiments of the present disclosure, a backlight module, a display module, a spliced display screen and a display apparatus according to an embodiment of the present disclosure will be described in further detail with reference to the accompanying drawings and the detailed description.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that this disclosure will be thorough and complete, and will fully convey the scope of the present disclosure to one ordinary skill in the art.

The disclosed embodiments are not limited to the embodiments shown in the drawings, but include modifications of configurations formed based on a manufacturing process. Thus, areas illustrated in the drawings have schematic properties, and shapes of the areas shown in the drawings illustrate specific shapes of the areas of elements, but are not intended to be limiting.

In the related art, referring to FIG. 1, FIG. 1 is a schematic cross-sectional view of a structure of an edge of a part of a display module in a spliced display screen in the prior art. The spliced display screen includes a plurality of display modules 14, and is formed by splicing together the plurality of display modules 14. Each display module 14 is composed of a backlight module 12 and a display panel 13, the display panel 13 is located on a light outgoing side of the backlight module 12, and the backlight module 12 provides backlight for the display panel 13. The backlight module 12 includes a middle frame 3, and the middle frame 3 includes a support portion 18 to support a peripheral edge of the display panel 13. In the related art, the middle frame 3 is a pure aluminum frame as a support structure of the display panel 13. The pure aluminum frame has light weight and good support strength, and a periphery of the display panel 13 is arranged on a support surface of the support portion 18 and adhered to the support surface of the support portion 18 by an adhesive.

In the related art, due to technical limitations, a width a of the support surface of the middle frame 3 for supporting the display panel 13 may only be 0.8 mm at minimum, a width b of a black matrix 17 (BM) for shielding a peripheral frame region of the display panel 13 may be 0.8 mm at minimum, and the width a of the support surface of the middle frame 3 for supporting the display panel 13 is consistent with the width b of the black matrix 17 (BM) for shielding the peripheral frame region of the display panel 13; due to the influence of the adhesion of the display panel 13 and the support surface of the middle frame 3 and the machining precision, the support surface of the middle frame 3 for supporting the display panel 13 may intrude into the display region 100 of the display panel 13, so that pixel blocking, rainbow mura display and the like occur in a region close to the frame region of the display panel 13; the rainbow mura display means that pixels (such as red, green and blue sub-pixels) of the display panel 13 close to the support surface of the middle frame 3 display red, green and blue, and pixels in other display regions of the display panel away from the support surface of the middle frame 3 display mixed colors such as white, which is formed by mixing red, green and blue. Meanwhile, the width of the support surface for supporting the display panel 13 cannot be matched with the width of the black matrix 17 in the frame region of the display panel 13 due to the problems of the attaching process and the processing precision for the aluminum frame, so that the physical splicing seam between the display modules 14 spliced together cannot be narrowed to the utmost extent; in addition, since the aluminum frame reflects light in a mirror manner, bright lines tend to appear at the edges of the display panel 13 when displaying.

Figure 2:
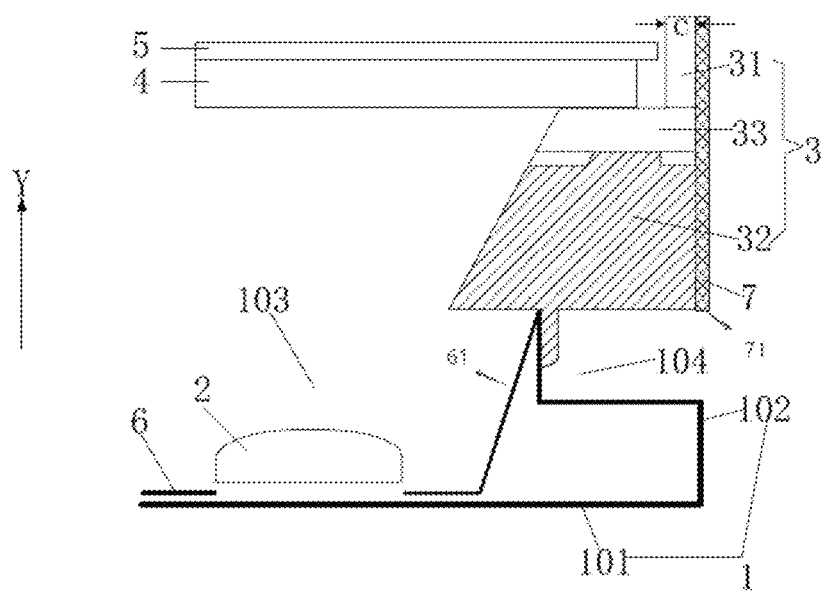
FIG. 2 is a schematic cross-sectional view of a structure of an edge of a part of a backlight module according to an embodiment of the present disclosure.
Figure 3:
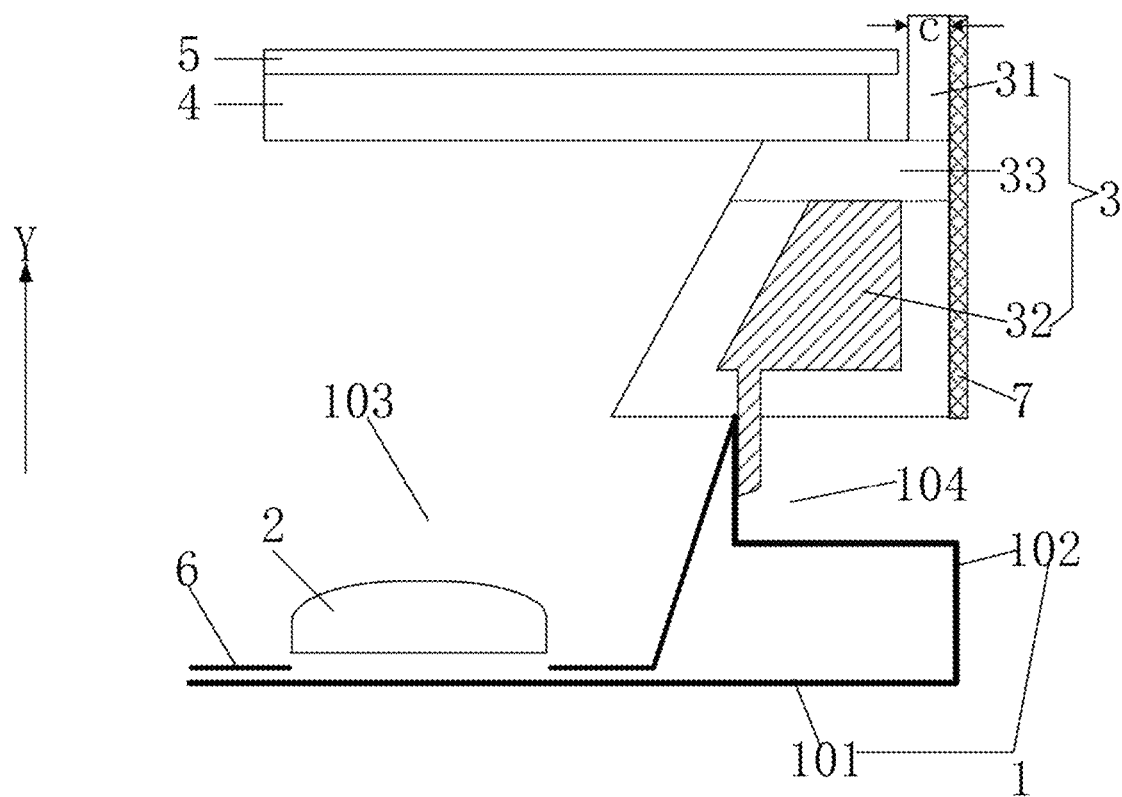
FIG. 3 is a schematic cross-sectional view of a structure of an edge of a part of a backlight module according to an embodiment of the present disclosure.

In view of the above problems, in a first aspect, a backlight module is provided in the embodiments of the present disclosure, referring to FIGS. 2 and 3, FIG. 2 is a schematic cross-sectional view of a structure of an edge of a part of a backlight module according to an embodiment of the present disclosure. FIG. 3 is a schematic cross-sectional view of another structure of an edge of a part of a backlight module according to an embodiment of the present disclosure. The backlight module includes: a back plate 1, a light source 2, a middle frame 3, a diffuser plate 4 and an optical film layer 5; the light source 2, the middle frame 3, the diffuser plate 4 and the optical film layer 5 are arranged on the back plate 1 and are sequentially arranged in a direction away from the back plate 1; orthographic projections of the optical film layer 5, the diffuser plate 4 and the light source 2 on the back plate 1 overlap with each other; an orthographic projection of the middle frame 3 on the back plate 1 overlaps with a peripheral edge of the back plate 1; the middle frame 3 is connected to the peripheral edge of the back plate 1; the orthographic projection of the middle frame 3 on the back plate 1 does not overlap with the orthographic projection of the light source 2 on the back plate 1; the middle frame 3 includes a body structure and a first support portion 31, wherein the body structure and the first support portion 31 are connected together to have a one-piece structure; the body structure is positioned on a side of the diffuser plate 4 close to the back plate 1, and the body structure supports a peripheral edge of the diffuser plate 4; the first support portion 31 is arranged around outer side of an end face of edges (an edge end face) of the diffuser plate 4 and the optical film layer 5, and is used for supporting the peripheral edge of the display panel on a side of the optical film layer 5 away from the back plate 1; the first support portion 31 is made of a light-transmitting material.

The back plate 1 includes a bottom wall 101 and a side wall 102, the side wall 102 surrounds a peripheral edge of the bottom wall 101, and is connected to the bottom wall 101 to form a first accommodating space 103, the light source 2 is located in the first accommodating space 103 and on the bottom wall 101; a part of the side wall 102 at at least one edge of the bottom wall 101 is recessed towards a side close to the first accommodating space 103 to form a second accommodating space 104 at a recessed surface of the part of the side wall 102 away from the first accommodating space 103. The second accommodating space 104 is configured to accommodate a peripheral circuit board and a flexible printed circuit board bound to the display panel. The display panel displays by the backlight provided from the backlight module.

In some embodiments, the backlight module further includes a reflective layer 6 disposed on a side of the bottom wall 101 of the back plate 1 close to the diffuser plate 4; an orthographic projection of the reflective layer 6 on the bottom wall 101 of the back plate 1 covers a region except the region where the light source 2 is located; a peripheral edge 61 of the reflective layer 6 extends towards the middle frame 3 and laps with a surface of the middle frame 3 close to the bottom wall 101 of the back plate 1. Therefore, the light emitted by the light source 2 can be totally reflected to the diffuser plate 4, and the utilization rate of the light is improved. The light source 2 includes a plurality of lamp beads evenly distributed on the back plate 1, and the light emitted by the light source 2 is irradiated to a side where the diffuser plate 4 is located. That is, the backlight module in this embodiment adopts the direct type backlight source, thereby reducing the seam width of the spliced display screen and realizing no-seam display of the spliced display screen. A distance between the back plate 1 and the diffuser plate 4 along the arrangement direction Y of the back plate and the diffuser plate is in a range from 20 mm to 30 mm, a thickness of the diffuser plate 4 is more than 1.5 mm. In this way, uniform mixing of light emitted by the light source 2 is easily realized.

In this embodiment, the first support portion 31 is made of the light-transmitting material, so that compared with the non-light-transmitting aluminum middle frame in the related art, the light directly or indirectly irradiated from the light source 2 onto the first support portion 31 passes through the first support portion 31 and then directly into a corresponding region of the display panel, thereby eliminating the defects such as dark pixels, incomplete pixel display, rainbow mura display or the like at the edge of the display panel due to light blocking by the aluminum middle frame in the related art; meanwhile, in the process of attaching the display panel to the support surface of the first support portion 31 and the process of processing the middle frame 3, the width of the support surface of the first support portion 31 does not need to be matched with the width of the black matrix in the frame region of the display panel, and the splicing seam of the spliced display screen adopting the backlight module can be narrowed extremely only by adjusting the width of the black matrix according to specific process conditions; in addition, the first support portion 31 is transparent, so that the defect of bright lines at the edge of the display module adopting the backlight module, caused by light reflected by the aluminum middle frame in the prior art, is avoided, the display image quality of the display module is improved, and the market competitiveness of the display module is improved.

In some embodiments, a dimension of the first support portion 31 in a direction away from the edge end face of the diffuser plate 4 is its thickness; a thickness c of the first support portion 31 is 0.8 mm or more. In some embodiments, the thickness c of the first support portion 31 is 0.8 mm. The first support portion 31 having this thickness can provide a stable support to the peripheral edge of the display panel, and cannot influence the normal display in a region of the peripheral edge of the display panel, and the thickness of 0.8 mm can also ensure that the display module adopting the backlight module can realize the extremely narrow frame, thereby ensuring that the spliced display screen adopting the backlight module can realize the extremely narrow splicing seam.

In some embodiments, a cross section of the first support portion 31 in a plane perpendicular to the back plate 1 is rectangular. Alternatively, the cross section of the first support portion 31 in the plane perpendicular to the back plate 1 may have other shape such as a trapezoidal shape, an inverted trapezoidal shape. The first support section 31 may have any shape as long as it can ensure that the display panel is stably supported.

In some embodiments, the body structure includes a body portion 32 and a second support portion 33, the body portion 32 and the second support portion 33 are sequentially arranged in the direction away from the back plate 1, and the body portion 32 and the second support portion 33 are connected together to have a one-piece structure; the second support portion 33 is in contact with a surface of the diffuser plate 4 close to the back plate 1; the second support portion 33 extends in a direction close to the edge end face of the diffuser plate 4, and is connected to the first support portion 31; the second support portion 33 is made of a light-transmitting material.

In some embodiments, the body portion 32 is made of a metal or metal alloy material; such as: aluminum or an aluminum alloy material (such as an aluminum alloy of type A16063); the light-transmitting material includes a transparent resin material doped with diffusion particles; such as: PC (polycarbonate) material doped with diffusing particles or other transparent material (such as PI (polyimide) material, PMMA (polymethyl methacrylate) material, etc.) doped with diffusing particles with a low thermal expansion coefficient. The body portion 32 made of the aluminum or aluminum alloy material has a light weight and a high structural strength, and can stably support the diffuser plate 4, the optical film layer 5 and the display panel; the first support portion 31 and the second support portion 33 which are made of the light-transmitting material doped with the diffusion particles can uniformly transmit light, so that the uniformity of the display brightness of the display panel is improved, and the display quality of the display module adopting the backlight module is improved.

In some embodiments, the body portion 32 is formed by an extrusion or stamping process; the first and second support portions 31 and 33 are integrally formed with the body portion 32 through an injection molding or extrusion molding process. The support surface of the first support section 31 that supports the display panel is adhered to the display panel by an adhesive. The support surface of the second support portion 33 supporting the diffuser plate 4 is adhered to the diffuser plate by an adhesive. The material and the manufacturing process of parts of the middle frame 3 can effectively avoid the reliability problem such as the glue failure and dropping-out between the display panel and the middle frame 3 and between the diffuser plate 4 and the middle frame 3 caused by the thermal expansion and contraction in the use of the display module adopting the backlight module, and the structural stability and firmness of the backlight module and even the display module adopting the backlight module are improved.

In some embodiments, the resultant body portion 32 is placed in a mold, and then the first and second support portions 31 and 33 are integrally formed with the body portion 32 by an injection molding or extrusion molding process.

In the related art, referring to FIG. 1, the aluminum middle frame 3 supports the peripheral edge of the diffuser plate 4 and the optical film 5 which are stacked together, the aluminum middle frame 3 is not transparent. In order to prevent the aluminum middle frame 3 from shielding the light emitted from the light source 2 to the peripheral edge region of the diffuser plate 4, a light guide bar 19 is disposed between the aluminum middle frame 3 and the peripheral edge region of the diffuser plate 4 which is in contact with and supported by the aluminum middle frame 3, the light guide strip 19 is made of a transparent material, so that the light from the light source 2 can be directly or indirectly irradiated to the peripheral edge region of the diffuser plate 4, thereby ensuring the uniform light emission of the entire diffuser plate 4. However, the light guide bar 19 is disposed between the aluminum middle frame 3 and the diffuser plate 4, which not only increases the material cost of the backlight module 12, but also increases the assembly cost of the backlight module 12.

In this embodiment, on one hand, the second support portion 33 is made of the light-transmitting material, the light directly or indirectly irradiated from the light source 2 to the second support portion 33 passes through the second support portion 33 and then directly into the diffuser plate 4, so that compared with that in the related art, the problem that the light irradiated from the light source to the peripheral edge of the diffuser plate 4 are shielded by the aluminum frame can be avoided, and the uniform light emission of the whole diffuser plate 4 can be ensured; on the other hand, the second support portion 33 is integrally formed with the body portion 32, so that the stability of supporting the diffuser plate 4 by the middle frame 3 can be ensured, but also the material cost and the assembly cost of the backlight module can be reduced.

In some embodiments, the dimension of the second support portion 33 in the direction Y away from the back plate 1 is a thickness thereof, and the thickness of the second support portion 33 is in a range of 1.2 mm to 2 mm. In some embodiments, the thickness of the second support portion 33 is 1.2 mm. With the thickness of the second support portion 33, the light emitted from the light source 2 passes through the second support portion 33 and into the edge region of the diffuser plate 4 in contact with the second support portion 33, thereby ensuring the uniformity of the light emitted from the whole diffuser plate 4.

In some embodiments, a cross section of the second support portion 33 in a plane perpendicular to the back plate 1 is rectangular. Alternatively, the cross section of the second support portion 33 in the plane perpendicular to the back plate 1 may have other shape such as a trapezoidal shape, an inverted trapezoidal shape. The second support section 33 may have any shape as long as it can ensure that the display panel is stably supported and the incidence of the light from the light source 2 to the diffuser plate 4 is not affected.

In some embodiments, referring to FIG. 3, the body portion 32 includes a first surface and a second surface, the first surface is a surface of the body portion 32 away from the diffuser plate 4; the second surface is the other surface than the first surface of the body portion 32; the first support portion 31 and/or the second support portion 33 also extend to cover at least the second surface of the body portion 32. In this embodiment, the first support portion 31 and/or the second support portion 33 also extend to cover all surfaces of the body portion 32 except for an injection port located on the side of the body portion 32 away from the diffuser plate 4. With such the arrangement, the middle frame 3 integrally formed through the injection molding or extrusion process is more secure, the dropping-out between the first support portion 31 and the second support portion 33 and the body portion 32 is not easily occurred, and a more stable and secure support can be provided to the diffuser plate 4 and the display panel.

In some embodiments, the backlight module further includes a first reflector 7 disposed on an outer side surface 300 of the middle frame 3 away from the edge end face of the diffuser plate 4 and the optical film layer 5, and the first reflector 7 covers a light-transmitting material layer on the outer side surface 300 of the middle frame 3; the first reflector 7 is in contact with the light-transmitting material layer, and the first reflector 7 can reflect the light irradiated to the first reflector 7 from the light source 2 into the light-transmitting material layer.

In some embodiments, the first reflector 7 is provided with a concave-convex structure 71 located on a surface of the first reflector 7 in contact with the middle frame 3. The light irradiated to the first reflector 7 from the light source 2 cannot pass through the first reflector 7, the first reflector 7 can reflect the light irradiated to the first reflector 7 into the light-transmitting material layer, thereby reducing the leakage of the light from the light source 2, improving the utilization rate of the light from the light source 2, and eliminating the influence of the external environment light on the display image. The concave-convex structure can reflect the light irradiated to the concave-convex structure towards different directions, to form a diffuse reflection, thereby scattering the light irradiated to the concave-convex structure, so that the light irradiated to and reflected by the concave-convex structure is more uniform.

In some embodiments, a reflectivity of the first reflector 7 is in a range from 40% to 50%, and a diffuse reflectivity of the first reflector 7 is in a range from 95% to 97%. The first reflector 7 may be, for example, a 3M2214 type paper self-adhesive tape.

Figure 4:
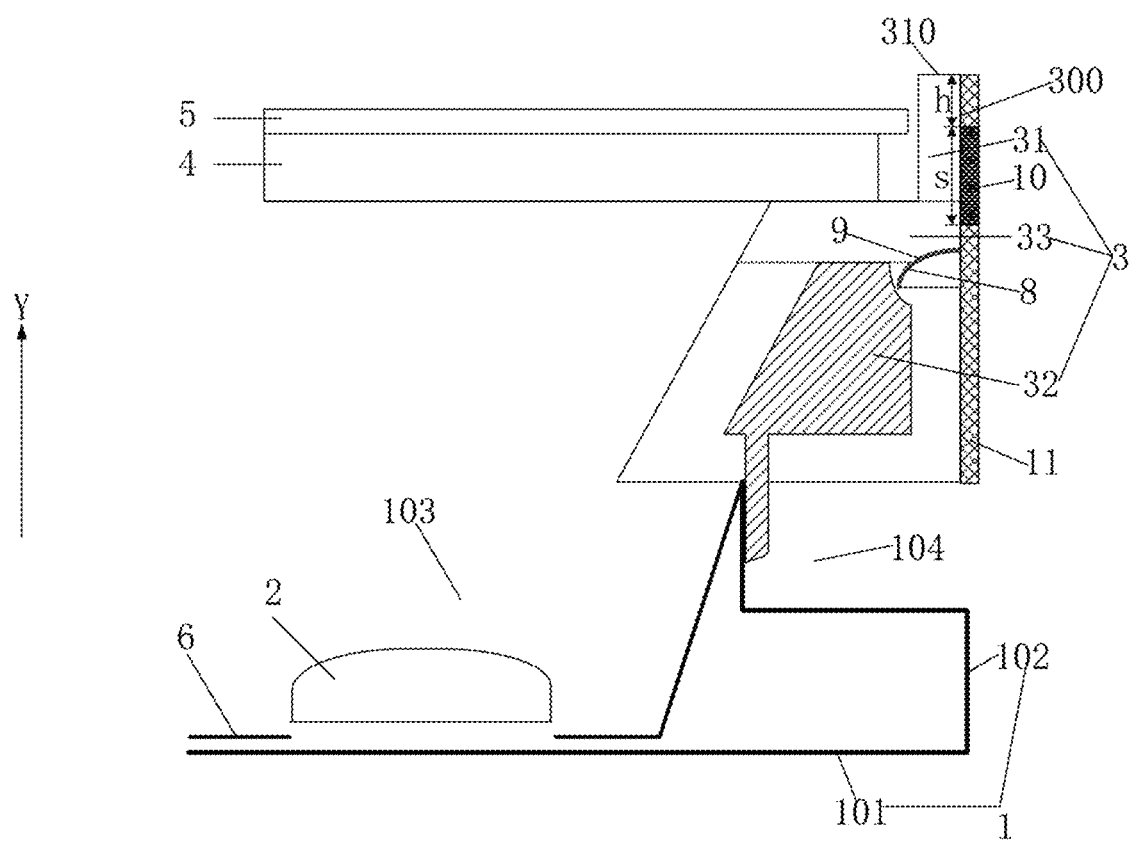
FIG. 4 is a schematic cross-sectional view of a structure of an edge of a part of a backlight module according to an embodiment of the present disclosure.

In some embodiments, referring to FIG. 4, FIG. 4 is a schematic cross-sectional view of another structure of an edge of a part of a backlight module according to an embodiment of the present disclosure. A groove 8 is formed in the light-transmitting material layer on the outer side surface 300 of the middle frame 3 away from the edge end face of the diffuser plate 4 and the optical film layer 5; the groove 8 is recessed towards a direction close to the edge end face of the diffuser plate 4; the groove 8 includes an arc surface recessed to a side where the first support portion 31 is located; a second reflector 9 is provided on the arc surface and can internally reflect the light irradiated to the second reflector 9 from the light source 2 towards the first support portion 31.

In some embodiments, referring to FIG. 4, the groove 8 is located at a height position where a surface of the body portion 32 close to the diffuser plate 4 is located.

In some embodiments, the second reflector 9 includes a white reflector; a reflectivity of the second reflector 9 in a range from 80% to 90%. In some embodiments, the reflectivity of the second reflector 9 is 87%.

Figure 5:
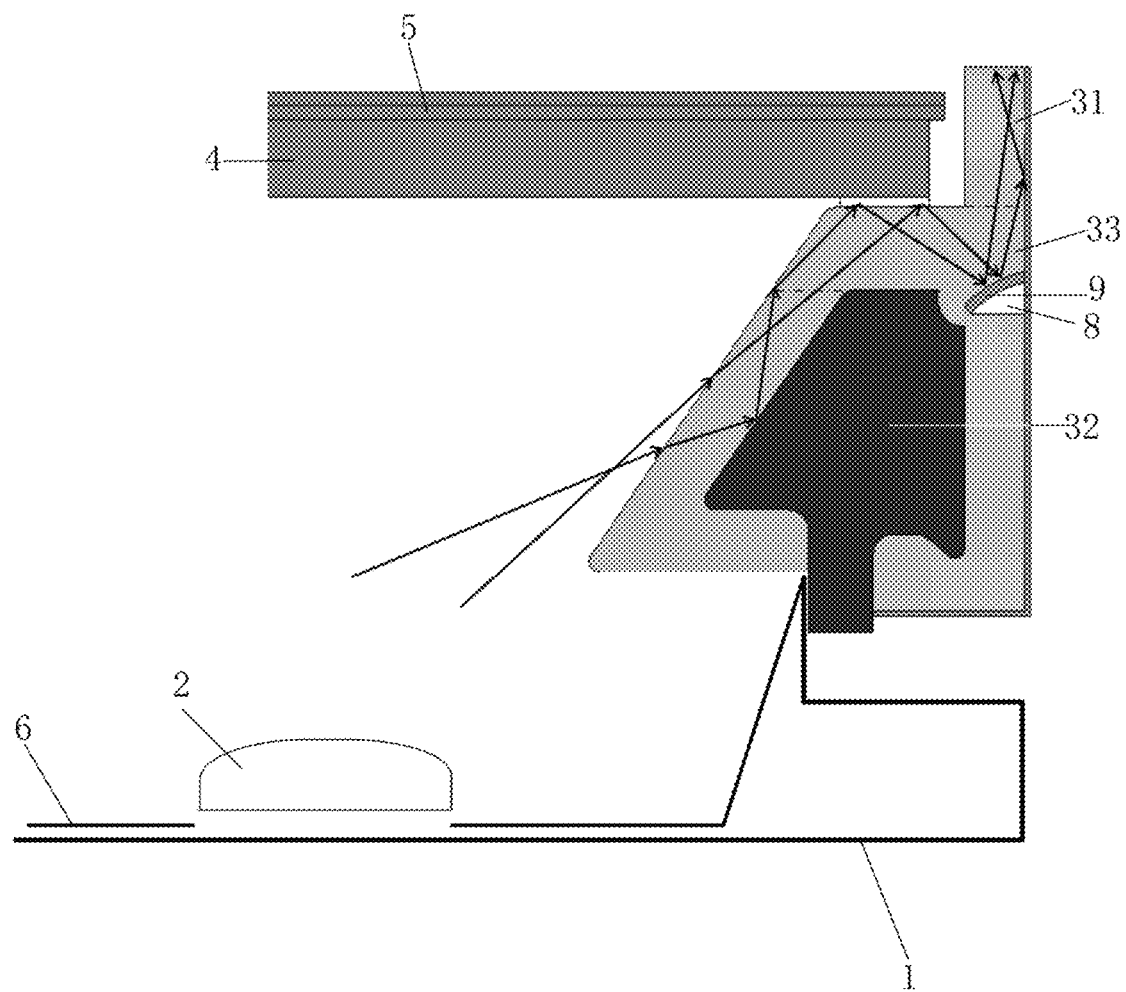
FIG. 5 is a simulation diagram of a light path of light emitted by a light source in the backlight module in FIG. 4.

In this embodiment, referring to FIG. 5, FIG. 5 is a simulation diagram of a light path of light emitted by a light source in the backlight module in FIG. 4. By providing the arc surface recessed to the side where the first support portion 31 is located and providing the second reflector 9 on the arc surface, light directly or indirectly irradiated from the light source 2 to the arc surface can be reflected, and the reflected light is converted to be emitted in a direction Y of the first support portion 31 away from the backboard 1, that is, most of the reflected light is incident into the first support portion 31, the light emitted from the first support portion 31 may reach an edge display region (an edge of the display region) of the display panel through the region of the display panel supported by the first support portion 31, therefore, a front brightness of the region of the display panel supported by the first support portion 31 is improved, the light intensity of the region of the display panel supported by the first support portion 31 is almost the same as the light intensity of the region not supported by the first support portion 31, and the problem of pixel shielding caused by the non-light-transmitting aluminum frame in the prior art is thoroughly solved.

In some embodiments, referring to FIG. 4, the body portion 32 is made of a metal or metal alloy material; such as: aluminum or an aluminum alloy material (such as an Al6063 type aluminum alloy); the light-transmitting material includes a transparent resin material, such as: PC material or other transparent material with a low thermal expansion coefficient (such as PI material, PMMA material, etc.). The body portion 32 made of the aluminum or aluminum alloy material has a light weight and a high structural strength, and can stably support the diffuser plate 4, the optical film layer 5 and the display panel; the first support portion 31 and the second support portion 33 made of the transparent resin material can transmit light, so that the uniformity of the display brightness of the display panel is improved, and the display quality of the display module adopting the backlight module is improved.

Compared with the backlight module in FIG. 3, the light-transmitting material of the backlight module in FIG. 4 may not be doped with diffusion particles. By providing the arc surface in the groove 8 and the second reflector 9 on the arc surface, it can be ensured that the light intensity of the region of the display panel supported by the first support portion 31 is almost same as the light intensity of the region of the display panel not supported by the first support portion 31, and thus, that the display brightness of the region of the display panel supported by the first support portion 31 and the display brightness of the region of the display panel not supported by the first support portion 31 are consistent. In the scheme of the backlight module shown in FIG. 4, since the light-transmitting material may not be doped with the diffusion particles, the material cost of the backlight module can be reduced, and there is a low requirement on the process for forming the middle frame 3 in which it is unnecessary to prepare the light-transmitting material with the diffusion particles, thereby reducing the process cost.

In some embodiments, referring to FIG. 4, the first support portion 31 includes a support surface 310 for contacting and supporting the display panel; the backlight module further includes a third reflector 10 arranged on an outer side surface 300 of the middle frame 3 away from the edge end face of the diffuser plate 4 and the optical film layer 5, and an orthographic projection of the third reflector 10 on the outer side surface 300 is positioned between the support surface 310 of the first support portion 31 and the groove 8; the third reflector 10 is in contact with the transparent material layer, and can reflect the light irradiated to the third reflector 10 by the light source 2 into the transparent material layer.

In some embodiments, a distance h between an edge of the third reflector 10 close to the support surface 310 of the first support portion 31 and the support surface 310 of the first support portion 31 along the arrangement direction Y of the back plate 1, the diffuser plate 4 and the optical film layer 5 is in a range of 1.5 mm to 2 mm; a distance s between two edges of the third reflector 10 sequentially arranged in the direction away from the support surface 310 of the first support portion 31 is in a range of 3 mm to 4 mm.

In some embodiments, the third reflector 10 surrounds the whole outer side surface 300 of the middle frame 3 away from the edge end face of the diffuser plate 4 and the optical film layer 5.

In some embodiments, the third reflector 10 includes a gold reflector; a reflectivity of the third reflector 10 is in a range of 28% to 30%; the third reflector 10 has an absorption rate in a range of 70% to 72% for the light irradiated to the third reflector 10 from the light source 2. The third reflector 10 can absorb 70% to 72% and reflect 28% to 30% of the light irradiated to the third reflector 10 from the light source 2. For example, the third reflector 10 is made of gold conductive cloth. In some embodiments, the reflectivity of the third reflector 10 is 29.2%; the third reflector 10 has an absorption rate of 70.8% for light irradiated to the third reflector 10 from the light source 2.

Figure 6:
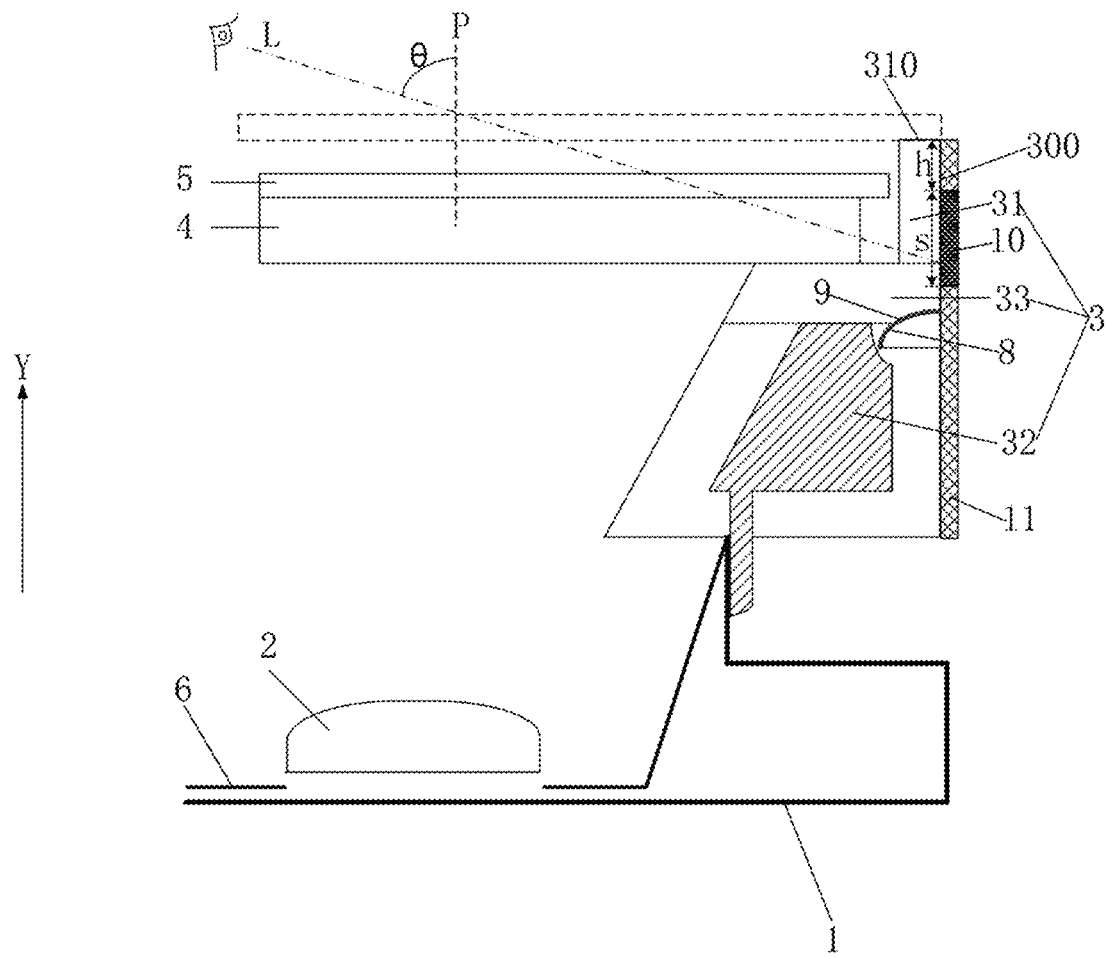
FIG. 6 is a schematic diagram illustrating a viewing angle at which a human eye views a display panel.

In this embodiment, FIG. 6 is a schematic diagram illustrating a viewing angle at which a human eye views a display panel. If the third reflector is not disposed in the backlight module, when the display screen is viewed from the display side of the display panel, referring to FIG. 6, when a viewing angle θ (i.e., an angle between a normal P of the display panel and a sight line L of the human eye) is more than 45 degrees, the human eye can see a bright line at a position of the first support portion 31; therefore, the third reflector 10 is arranged in a specific region between the support surface 310 of the first support portion 31 and the groove 8 on the outer side surface 300 of the middle frame 3, and surrounds the outer side surface 300 of the middle frame 3; the third reflector 10 can absorb the most and reflect a small minority of light irradiated onto the third reflector 10 from the light source 2, so that the problem can be eliminated that the bright lines appear at the position of the first support portion 31 when viewing the display panel at the viewing angle of 45 degrees or more, and the viewing experience at different viewing angles can be improved.

In some embodiments, referring to FIG. 4, the backlight module further includes a fourth reflector 11 disposed on the outer side surface 300 of the middle frame 3 away from the edge end face of the diffuser plate 4 and the optical film layer 5; the fourth reflector 11 covers the region of the light-transmitting material layer except for the region where the third reflector 10 is located and an opening of the groove 8; the fourth reflector 11 is in contact with the transparent material layer, and the fourth reflector 11 can reflect the light irradiated to the fourth reflector 11 from the light source 2 into the transparent material layer.

In some embodiments, the fourth reflector 11 includes a white reflector; the reflectivity of the fourth reflector 11 is in a range from 80% to 90%. In some embodiments, the fourth reflector 11 has the reflectivity of 87%. The light irradiated to the fourth reflector 11 from the light source 2 cannot pass through the fourth reflector 11, the fourth reflector 11 can reflect the light irradiated to the fourth reflector 11 into the light-transmitting material layer, thereby reducing the leakage of the light from the light source 2, improving the utilization rate of the light from the light source 2, and eliminating the influence of the external environment light on the display image.

Figure 7:
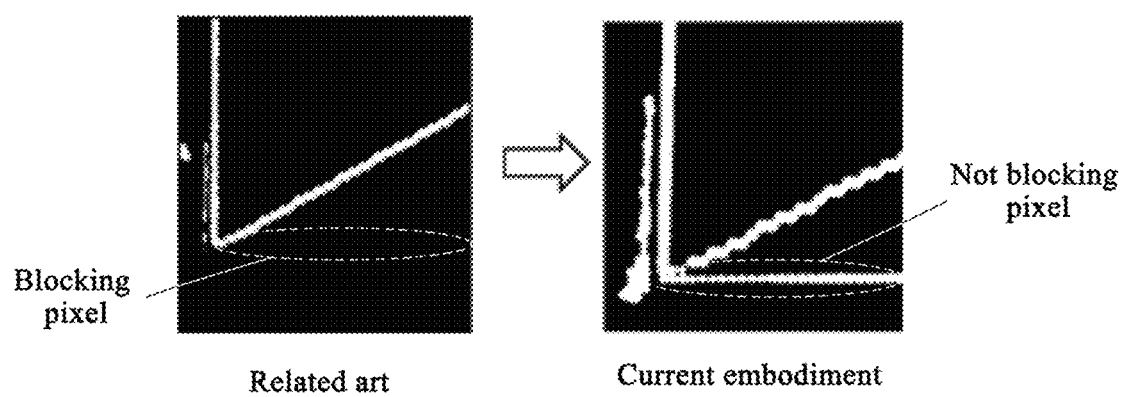
FIG. 7 is a schematic diagram showing a comparison between effects of a backlight module in the prior art and a backlight module according to an embodiment of the present disclosure on blocking pixels at an edge of a display panel.
Figure 8:
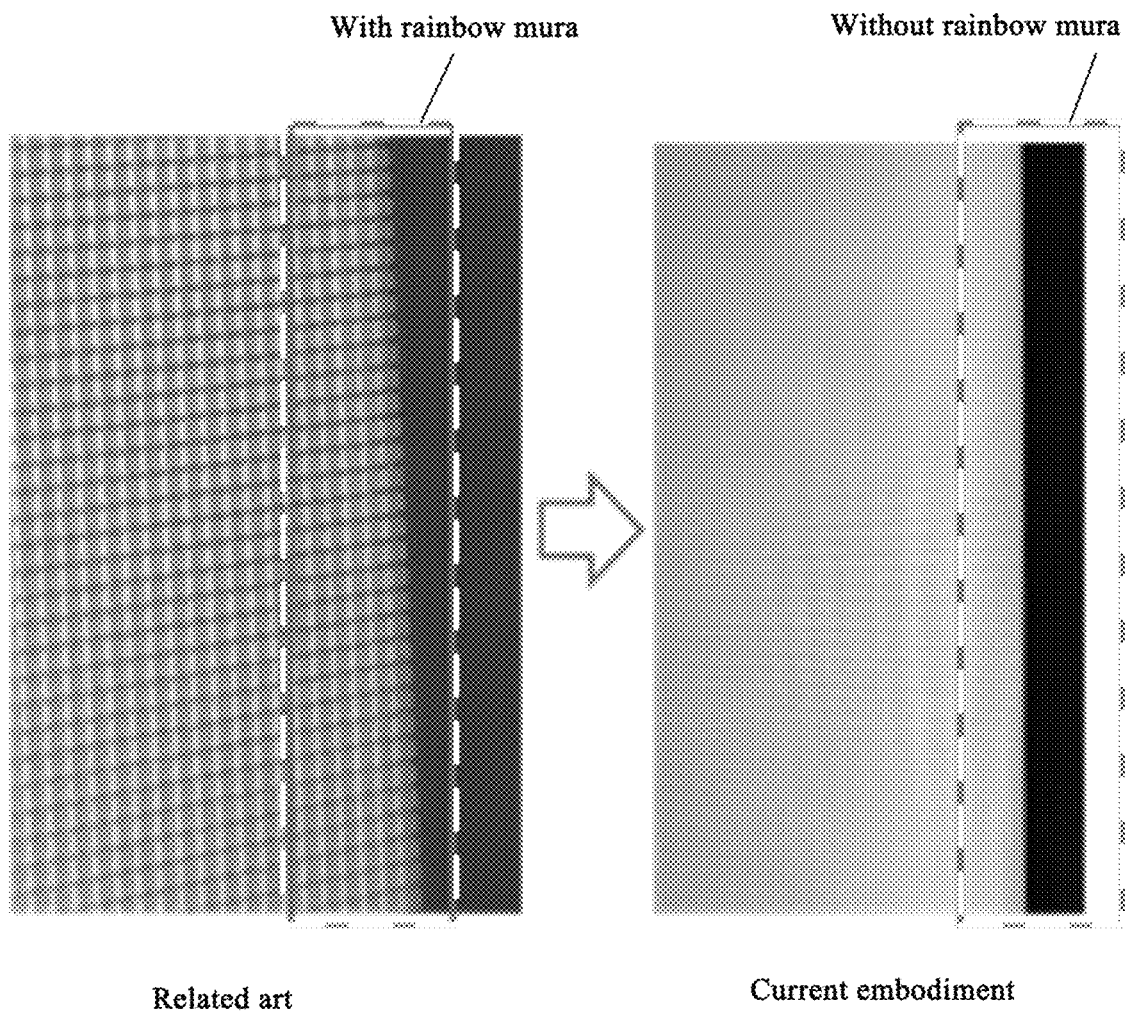
FIG. 8 is a schematic diagram showing a comparison between effects of a backlight module in the prior art and a backlight module according to an embodiment of the present disclosure on rainbow mura at an edge of a display panel.
Figure 9:
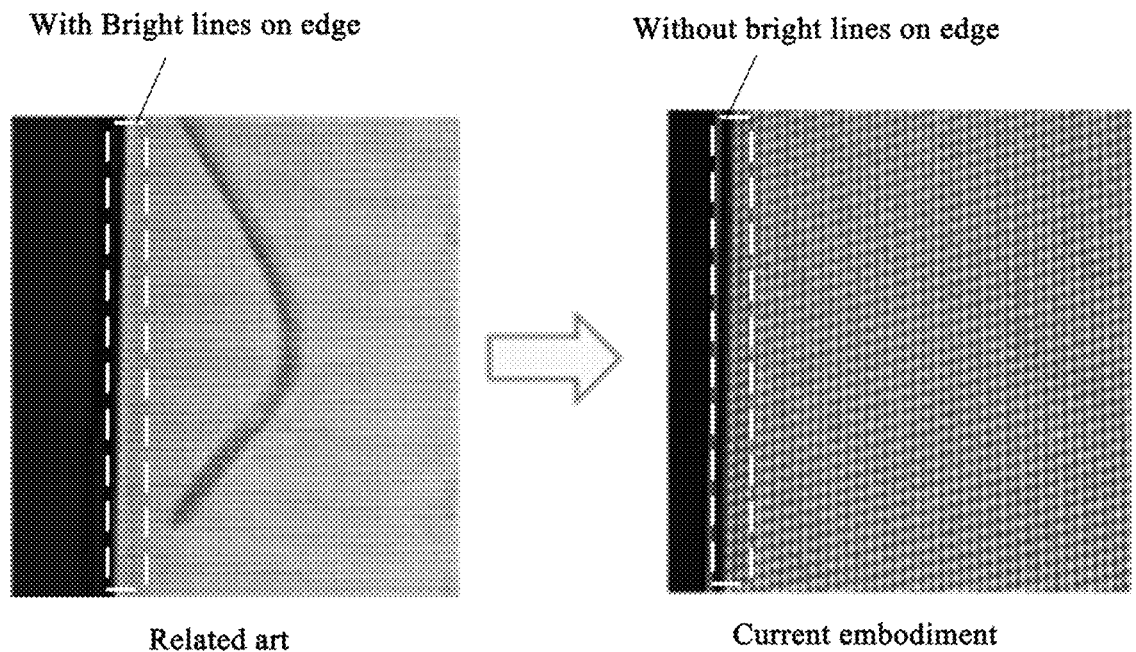
FIG. 9 is a schematic diagram showing a comparison between effects of a backlight module in the prior art and a backlight module according to an embodiment of the present disclosure on bright lines at an edge of a display panel.

In this embodiment, referring to FIG. 7, FIG. 7 is a schematic diagram showing a comparison between effects of a backlight module in the prior art and a backlight module according to an embodiment of the present disclosure on blocking pixels at an edge of a display panel. FIG. 8 is a schematic diagram showing a comparison between effects of a backlight module in the prior art and a backlight module according to an embodiment of the present disclosure on rainbow mura at an edge of a display panel. FIG. 9 is a schematic diagram showing a comparison between effects of a backlight module in the prior art and a backlight module according to an embodiment of the present disclosure on bright lines at an edge of a display panel. The first support portion 31 is made of the light-transmitting material, so that compared with the non-light-transmitting aluminum middle frame in the related art, the light directly or indirectly irradiated from the light source 2 onto the first support portion 31 passes through the first support portion 31 and then directly into the corresponding region of the display panel, thereby eliminating the defects such as dark pixels, incomplete pixel display, rainbow mura or the like at the edge of the display panel due to light blocking by the aluminum middle frame in the related art; meanwhile, in the process of attaching the display panel to the support surface of the first support portion 31 and the process of processing the middle frame 3, the width of the support surface of the first support portion 31 does not need to be matched with the width of the black matrix in the frame region of the display panel, and the splicing seam of the spliced display screen adopting the backlight module can be narrowed extremely only by adjusting the width of the black matrix according to specific process conditions; in addition, the first support portion 31 is transparent, so that the defect of bright lines at the edges of the display module adopting the backlight module, caused by light reflected by the aluminum middle frame in the prior art, is avoided, the display image quality of the display module is improved, and the market competitiveness of the display module is improved.

Figure 10:
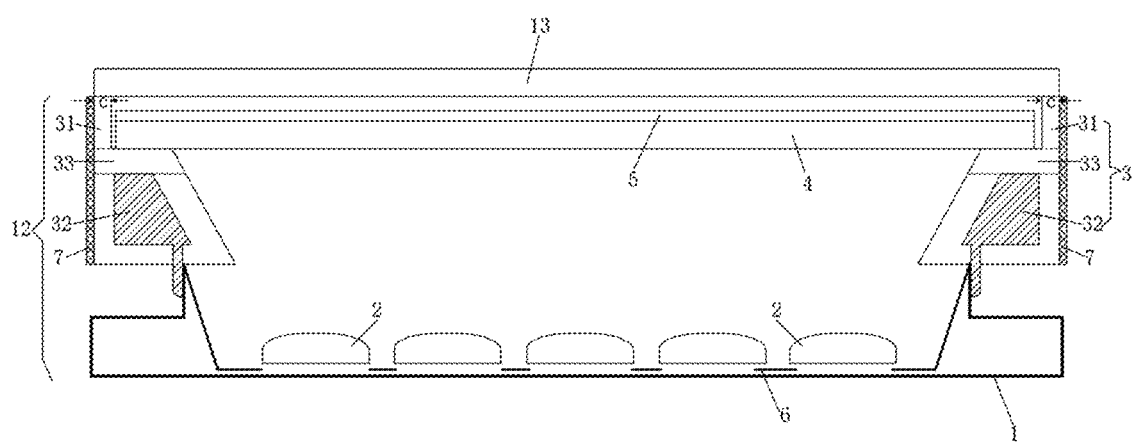
FIG. 10 is a cross-sectional view of a structure of a display module according to an embodiment of the present disclosure.

In a second aspect, an embodiment of the present disclosure provides a display module, referring to FIG. 10. FIG. 10 is a cross-sectional view of a structure of a display module according to an embodiment of the present disclosure. The display module includes the backlight module 12 in the above embodiment, and further includes a display panel 13 located on a side of the optical film layer 5 of the backlight module 12 away from the back plate 1, and the first support portion 31 of the backlight module 12 contacts and supports the peripheral edge of the display panel 13.

The first support portion 31 is disposed along the whole peripheral edge of the display panel 13, and the support surface of the first support portion 31 is adhered to a surface of the peripheral edge of the display panel 13 close to the backlight module 12 by a transparent adhesive.

In some embodiments, the second support portion 33 of the backlight module 12 is located on a side of the first support portion 31 away from the display panel 13, and is used for supporting the first support portion 31; the body portion of the backlight module 12 is located on a side of the second support portion 33 away from the display panel 13, and is used for supporting the second support portion 33 and the first support portion 31.

In some embodiments, the display panel 13 is a liquid crystal display panel, and includes at least an array substrate and a color filter substrate arranged in an aligning and assembling manner, and a liquid crystal layer filled in the cell gap. The backlight module 12 provides a direct-type backlight for the display panel 13. The diffuser plate 4 is used for scattering the light provided by the light source 2, so that the light is more uniform; the optical film layer 5 is used for further optically processing the light emitted from the diffuser plate 4, which is in turn provided to the display panel 13.

In some embodiments, the second accommodating space in a side wall of the back plate 1 is used for accommodating a peripheral circuit board and/or a flexible circuit board bound to the display panel 13. Therefore, it is unnecessary to specially provide a position for placing the peripheral circuit board and/or the flexible circuit board, and the liquid crystal display panel adopting the direct-type backlight is more compact in structure and lighter and thinner.

The backlight module is used in the embodiment, thereby eliminating the defects such as dark pixels, incomplete pixel display, rainbow mura display or the like at the edge of the display panel due to light blocking by the aluminum middle frame in the related art; avoiding the defect of bright lines at the edge of the backlight module, caused by light reflected by the aluminum middle frame in the prior art, improving the display image quality of the display module and the market competitiveness of the display module.

Figure 11:
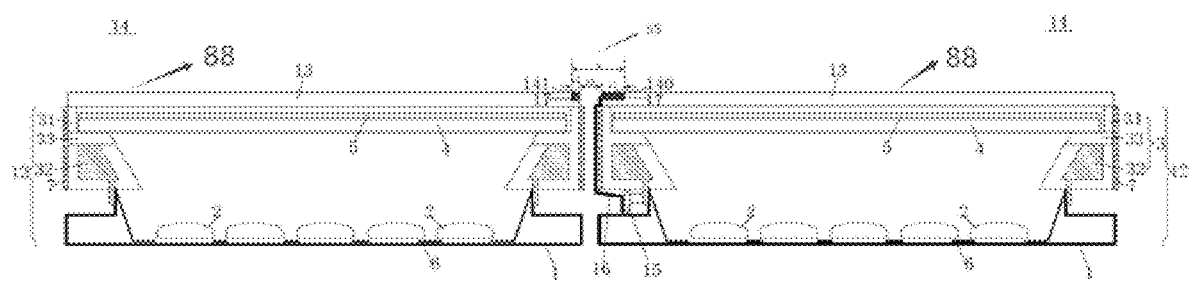
FIG. 11 is a schematic cross-sectional view of a structure of a spliced display screen according to an embodiment of the present disclosure.

In a third aspect, an embodiment of the present disclosure further provides a spliced display screen. FIG. 11 is a schematic cross-sectional view of a structure of a spliced display screen according to an embodiment of the present disclosure. Referring to FIG. 11, the spliced display screen includes a plurality of the display modules 14 in above embodiments, corresponding edges of the plurality of display modules 14 abut against each other, and thus, the display surfaces 88 of the plurality of display modules 14 are flush with each other.

In some embodiments, the display module 14 includes a binding-side frame region 140 (a first frame region 140) and a non-binding-side frame region 141 (a second frame region 141), and in any two display modules 14 abutted against each other, the binding-side frame region 140 of one display module 14 and the non-binding-side frame region 141 of the other display module 14 abut against each other to form a splicing seam SS.

The binding-side frame region 140 refers to a frame region of the display panel 13 where a binding terminal for binding to the peripheral circuit board 15 is disposed. For example, the binding terminal is bound to the flexible circuit board 16, thereby realizing the binding of the binding terminal to the peripheral circuit board 15. The non-binding-side frame region 141 refers to a frame region of the display panel 13 where the binding terminal for binding to the peripheral circuit board 15 is not disposed.

In some embodiments, the binding terminal in the binding-side frame region 140 is provided in both side binding and edge binding ways. In the side binding way, edge end faces of upper and lower substrates of the display panel on a binding side are aligned with each other, the binding terminal is provided on the edge end faces on the binding side; in the binding process, one end of the flexible circuit board 16 is bound to the binding terminal through a conductive silver adhesive, and the other end of the flexible circuit board 16 is bound to the peripheral circuit board 15. In the edge binding way, a portion of the upper substrate of the display panel at an edge on the binding side is cut off, so that a binding-side edge region of the lower substrate is exposed, the binding terminal is arranged in the exposed binding-side edge region of the lower substrate; and in the binding process, one end of the flexible circuit board 16 is bound to the binding terminal; the flexible circuit board 16 is bent downwards to cover the edge end face on the binding side of the lower substrate and is bent to a back side of the lower substrate, and then the other end of the flexible circuit board 16 is bound to the peripheral circuit board 15 positioned on the back side.

In some embodiments, a part of the peripheral circuit board 15 and the flexible circuit board 16 are accommodated in the second accommodating space in the side wall of the back plate 1.

In some embodiments, a shape of the display panel 13 includes a rectangle; two adjacent side frame regions (e.g., upper side and left side frame regions) of the display panel 13 are binding-side frame regions 140, and two other adjacent side frame regions (e.g., right side and lower side frame regions) of the display panel 13 are non-binding-side frame regions 141. In any two display modules 14 abutting against each other, the binding-side frame region 140 of one display module 14 and the non-binding-side frame region 141 of the other display module 14 abut against each other to form a splicing seam; which can ensure that a width of each splicing seam of the whole spliced display screen is constant, and thus ensure the whole display effect of the spliced display screen.

In some embodiments, a width x1 of the binding-side frame region 140 is 1.2 mm or more; a width x2 of the non-binding-side frame region 141 is 0.5 mm or more. In some embodiments, the width x1 of the binding-side frame region 140 is 1.2 mm; the width x2 of the non-binding-side frame region 141 is 0.5 mm.

In some embodiments, both the binding-side frame region 140 and the non-binding-side frame region 141 of the display module 14 are covered by the black matrixes 17; namely, a width of the black matrix 17 covering the binding-side frame region 140 is 1.2 mm or more; a width of the black matrix 17 covering the non-binding-side frame region 141 is 0.5 mm or more.

In some embodiments, a width x of each splicing seam SS is 2.3 mm or more. In some embodiments, the width x of each splicing seam SS is 2.3 mm.

For example: a gap width x3 occupied by the appearance parts and other structures between any two adjacent display modules 14 abutting against each other is 0.6 mm; the width x1 of the binding-side frame region 140 is 1.2 mm; the width x2 of the non-binding-side frame region 141 is 0.5 mm; then the width of the splicing seam SS between any two adjacent display modules 14 abutting against each other is x=x1+x2+x3=1.2+0.5+0.6=2.3 mm.

In this embodiment, the spliced display screen is formed by adopting the display modules abutting against each other in the above embodiment, so that it is unnecessary to match the width of the support surface of the first support portion and the width of the black matrix in the frame region of the display module. The splicing seam of the spliced display screen can be narrowed extremely only by adjusting the width of the black matrix according to specific process conditions; thereby improving the display effect of this spliced display screen.

In a fourth aspect, an embodiment of the present disclosure further provides a display apparatus, which includes the spliced display screen in the foregoing embodiments.

The spliced display screen is used in the embodiment, thereby eliminating the defects such as dark pixels, incomplete pixel display, rainbow mura display or the like at the edge of the display apparatus due to light blocking by the aluminum middle frame in the related art; avoiding the defect of bright lines at the edge of the display apparatus, caused by light reflected by the aluminum middle frame in the prior art, improving the display image quality of the display apparatus, realizing the extremely narrow frame of the display apparatus and improving the market competitiveness of the display apparatus.

The display apparatus may be any product or component with a display function, such as an LCD panel, an LCD television, a mobile phone, a tablet computer, a notebook computer, a display, a digital photo frame, a navigator or the like.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A backlight module, comprising: a back plate, a light source, a middle frame, a diffuser plate and an optical film layer;
    wherein the light source, the middle frame, the diffuser plate and the optical film layer are on the back plate and are sequentially arranged in a direction away from the back plate;
    a light outgoing surface of the light source faces the diffuser plate; orthographic projections of the optical film layer, the diffuser plate and the light source on the back plate overlap with each other;
    an orthographic projection of the middle frame on the back plate overlaps with a peripheral edge of the back plate; the middle frame is connected to the peripheral edge of the back plate;
    the orthographic projection of the middle frame on the back plate does not overlap with the orthographic projection of the light source on the back plate;
    the middle frame comprises a body structure and a first support portion, wherein the body structure and the first support portion are connected together to have a one-piece structure;
    the body structure is on a side of the diffuser plate close to the back plate, and the body structure supports a peripheral edge of the diffuser plate;
    the first support portion is arranged outside an edge end face of the diffuser plate and an edge end face of the optical film layer, and is used for supporting a peripheral edge of a display panel on a side of the optical film layer away from the back plate; and
    the first support portion is made of a light-transmitting material;
    the backlight module further comprises a groove in a light-transmitting material layer on an outer side surface of the middle frame away from the edge end face of the diffuser plate and the edge end face of the optical film layer;
    the groove is recessed towards the edge end face of the diffuser plate;
    the groove is configured such that the middle frame comprises an arc surface which is convex towards a side where the first support portion is located;
    a second reflector is on the arc surface; and
    the second reflector is capable of reflecting light irradiated onto the second reflector from the light source towards inside of the first support portion.

2. The backlight module according to claim 1, wherein the body structure comprises a body portion and a second support portion, the body portion and the second support portion are sequentially arranged in the direction away from the back plate, and the body portion and the second support portion are connected together to have a one-piece structure;
    the second support portion is in contact with a surface of the diffuser plate close to the back plate;
    the second support portion extends in a direction close to the edge end face of the diffuser plate, and is connected to the first support portion; and
    the second support portion is made of a light-transmitting material.

3. The backlight module according to claim 2, wherein the body portion comprises a first surface and a second surface, the first surface is one surface of the body portion away from the diffuser plate; the second surface is the other surface than the first surface of the body portion; and
    the first support portion and/or the second support portion further extends to cover at least the second surface of the body portion.

4. The backlight module according to claim 3, further comprising a first reflector on the outer side surface of the middle frame away from the edge end face of the diffuser plate and the edge end face of the optical film layer, wherein the first reflector covers a light-transmitting material layer on the outer side surface of the middle frame; and
    the first reflector is in contact with the light-transmitting material layer, and the first reflector is capable of reflecting light irradiated onto the first reflector from the light source into the light-transmitting material layer.

5. The backlight module according to claim 3, wherein a dimension of the first support portion in a direction away from the edge end face of the diffuser plate is a thickness of the first support portion, which is 0.8 mm or more; and
a dimension of the second support portion in a direction away from the back plate is a thickness of the second support portion, which is in a range of 1.2 mm to 2 mm.

6. The backlight module according to claim 1, wherein the groove is at a height where a surface of the body portion close to the diffuser plate is located.

7. The backlight module according to claim 1, wherein the first support portion comprises a support surface which is in contact with the display panel and support the display panel;
the backlight module further comprises a third reflector on the outer side surface of the middle frame away from the edge end face of the diffuser plate and the edge end face of the optical film layer, and an orthographic projection of the third reflector on the outer side surface is between the support surface of the first support portion and the groove; and
the third reflector is in contact with the light-transmitting material layer, and is capable of reflecting the light irradiated onto the third reflector from the light source into the light-transmitting material layer.

8. The backlight module according to claim 7, wherein a distance between an edge of the third reflector close to the support surface of the first support portion and the support surface of the first support portion along an arrangement direction of the back plate, the diffuser plate and the optical film layer is in a range of 1.5 mm to 2 mm; and
a distance between two edges of the third reflector sequentially arranged in a direction away from the support surface of the first support portion is in a range of 3 mm to 4 mm.

9. The backlight module according to claim 7, further comprising a fourth reflector on the outer side surface of the middle frame away from the edge end face of the diffuser plate and the edge end face of the optical film layer; wherein the fourth reflector covers a region of the light-transmitting material layer except for where the third reflector is located and covers an opening of the groove;
the fourth reflector is in contact with the light-transmitting material layer, and the fourth reflector is capable of reflecting the light irradiated onto the fourth reflector from the light source into the light-transmitting material layer.

10. The backlight module according to claim 9, wherein each of the second reflector and the fourth reflector has a reflectivity in a range of 80% to 90%, respectively;
the third reflector has a reflectivity in a range of 28% to 30%;
the third reflector has an absorptivity in a range of 70% to 72% for the light irradiated onto the third reflector from the light source;
the body portion is made of a metal or a metal alloy; and
the light-transmitting material comprises a transparent resin material.

11. The backlight module according to claim 1, wherein the back plate comprises a bottom wall and a side wall,
the side wall surrounds a peripheral edge of the bottom wall, and is connected to the bottom wall to form a first accommodating space, the light source is in the first accommodating space and on the bottom wall; and
a part of the side wall on at least one side is recessed towards the first accommodating space to form a second accommodating space at a recessed surface away from the first accommodating space.

12. The backlight module according to claim 11, further comprising a reflective layer on a side of the bottom wall of the back plate close to the diffuser plate;
wherein an orthographic projection of the reflective layer on the bottom wall of the back plate covers a region except a region where the light source is located; and
a peripheral edge of the reflective layer extends towards the middle frame and laps with a surface of the middle frame close to the bottom wall of the back plate.

13. A backlight module, comprising: a back plate, a light source, a middle frame, a diffuser plate and an optical film layer;
wherein the light source, the middle frame, the diffuser plate and the optical film layer are on the back plate and are sequentially arranged in a direction away from the back plate;
a light outgoing surface of the light source faces the diffuser plate; orthographic projections of the optical film layer, the diffuser plate and the light source on the back plate overlap with each other;
an orthographic projection of the middle frame on the back plate overlaps with a peripheral edge of the back plate; the middle frame is connected to the peripheral edge of the back plate;
the orthographic projection of the middle frame on the back plate does not overlap with the orthographic projection of the light source on the back plate;
the middle frame comprises a body structure and a first support portion, wherein the body structure and the first support portion are connected together to have a one-piece structure;
the body structure is on a side of the diffuser plate close to the back plate, and the body structure supports a peripheral edge of the diffuser plate;
the first support portion is arranged outside an edge end face of the diffuser plate and an edge end face of the optical film layer, and is used for supporting a peripheral edge of a display panel on a side of the optical film layer away from the back plate; and
the first support portion is made of a light-transmitting material;
wherein the body structure comprises a body portion and a second support portion, the body portion and the second support portion are sequentially arranged in the direction away from the back plate, and the body portion and the second support portion are connected together to have a one-piece structure;
the second support portion is in contact with a surface of the diffuser plate close to the back plate;
the second support portion extends in a direction close to the edge end face of the diffuser plate, and is connected to the first support portion; and
the second support portion is made of a light-transmitting material;
wherein the body portion comprises a first surface and a second surface, the first surface is one surface of the body portion away from the diffuser plate; the second surface is the other surface than the first surface of the body portion; and
the first support portion and/or the second support portion further extends to cover at least the second surface of the body portion;

the backlight module further comprises a first reflector on an outer side surface of the middle frame away from the edge end face of the diffuser plate and the edge end face of the optical film layer, wherein the first reflector covers a light-transmitting material layer on the outer side surface of the middle frame; and the first reflector is in contact with the light-transmitting material layer, and the first reflector is capable of reflecting light irradiated onto the first reflector from the light source into the light-transmitting material layer;

wherein the first reflector comprises a concave-convex structure on a surface of the first reflector in contact with the middle frame;

the first reflector has a reflectivity in a range from 40% to 50%; and the first reflector has a diffuse reflectivity in a range from 95% to 97%; the body portion is made of a metal or a metal alloy; and the light-transmitting material comprises a transparent resin material doped with diffusion particles.

14. A display module, comprising a backlight module, which comprises a back plate, a light source, a middle frame, a diffuser plate and an optical film layer;

wherein the display module further comprises a display panel on a side of the optical film layer of the backlight module away from the back plate, and wherein the light source, the middle frame, the diffuser plate and the optical film layer are on the back plate and are sequentially arranged in a direction away from the back plate;

a light outgoing surface of the light source faces the diffuser plate; orthographic projections of the optical film layer, the diffuser plate and the light source on the back plate overlap with each other;

an orthographic projection of the middle frame on the back plate overlaps with a peripheral edge of the back plate; the middle frame is connected to the peripheral edge of the back plate;

the orthographic projection of the middle frame on the back plate does not overlap with the orthographic projection of the light source on the back plate;

the middle frame comprises a body structure and a first support portion, wherein the body structure and the first support portion are connected together to have a one-piece structure;

the body structure is on a side of the diffuser plate close to the back plate, and the body structure supports a peripheral edge of the diffuser plate;

the first support portion is arranged outside an edge end face of the diffuser plate and an edge end face of the optical film layer, and is used for supporting a peripheral edge of the display panel on a side of the optical film layer away from the back plate; and the first support portion is made of a light-transmitting material;

the first support portion of the backlight module is in contact with the peripheral edge of the display panel and supports the display panel;

the backlight module further comprises a groove in a light-transmitting material layer on the outer side surface of the middle frame away from the edge end face of the diffuser plate and the edge end face of the optical film layer;

the groove is recessed towards the edge end face of the diffuser plate;

the groove is configured such that the middle frame comprises an arc surface which is convex towards a side where the first support portion is located;

a second reflector is on the arc surface; and the second reflector is capable of reflecting light irradiated onto the second reflector from the light source towards inside of the first support portion.

15. The display module according to claim 14, wherein a second support portion of the backlight module is on a side of the first support portion away from the display panel, and configured to support the first support portion; and the body structure comprises a body portion, and the body portion is on a side of the second support portion away from the display panel, and configured to support the second support portion and the first support portion.

16. The display module according to claim 14, wherein the back plate comprises a bottom wall and a side wall, the side wall surrounds a peripheral edge of the bottom wall, and is connected to the bottom wall to form a first accommodating space, the light source is in the first accommodating space and on the bottom wall; and a part of the side wall on at least one side is recessed towards the first accommodating space to form a second accommodating space at a recessed surface away from the first accommodating space, wherein the second accommodating space on the side wall of the back plate is configured to accommodate a peripheral circuit board and/or a flexible circuit board bound to the display panel.

17. A spliced display screen, comprising a plurality of display modules, each of which is the display module according to claim 14, wherein corresponding edges of the plurality of display modules abut against each other, and display surfaces of the plurality of display modules are flush with each other.

18. The spliced display screen according to claim 17, wherein the display module comprises a first frame region and a second frame region, and in any two display modules abutting against each other, the first frame region of one of the display modules abuts against the second frame region of the other one of the display modules to form a splicing seam.

19. The spliced display screen according to claim 18, wherein a width of the first frame region is 1.2 mm or more; a width of the second frame region is 0.5 mm or more; and a width of the splicing seam is 2.3 mm or more.

* * * * *